Dec. 3, 1929.                J. A. PIERSON                1,738,151
                            DRILLING MACHINE
                          Filed May 23, 1921
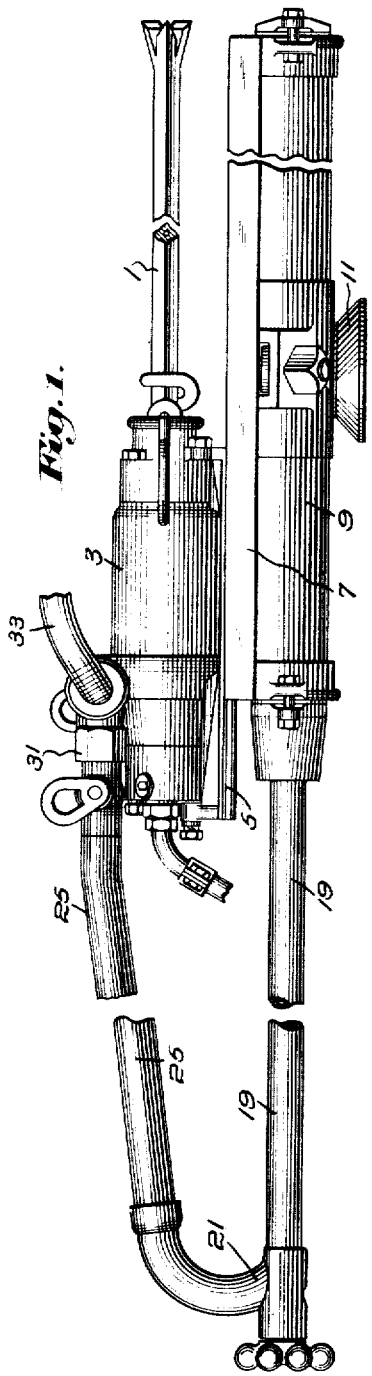
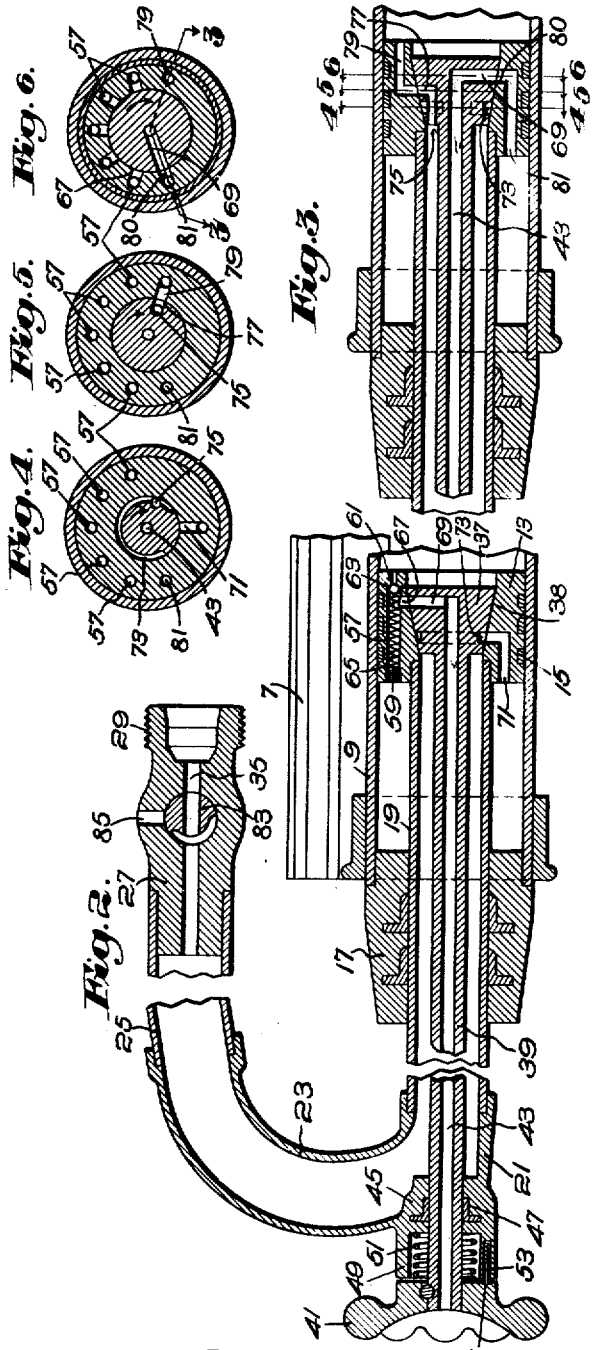
Inventor:
John Albert Pierson.
by Emery, Booth, Janney & Varney.
Attys.

Patented Dec. 3, 1929

1,738,151

UNITED STATES PATENT OFFICE

JOHN ALBERT PIERSON, OF MELROSE HIGHLANDS, MASSACHUSETTS, ASSIGNOR TO GEORGE H. GILMAN, OF BELMONT, MASSACHUSETTS

DRILLING MACHINE

Application filed May 23, 1921. Serial No. 471,863.

My invention relates to machines and devices employing fluid pressure operated power cylinders and particularly but not exclusively to a rock drilling machine.

My invention will be best understood from the following description when read in light of the accompanying drawings of a specific embodiment of my invention selected for illustrative purposes, while the scope of my invention will be particularly pointed out in the appended claims.

In the drawings:—

Fig. 1 shows an elevation of a rock drilling machine;

Fig. 2 is a vertical sectional elevation of the rearward part of the machine with parts broken away;

Fig. 3 is a fragmentary view similar to Fig. 2 with the valve moved to another position and corresponding to a section on the line 3—3 of Fig. 6;

Figs. 4, 5 and 6 respectively are sections on the lines 4—4, 5—5 and 6—6 of Fig. 3.

Referring to the drawings, I have shown a drill bit 1 actuated by a percussive instrumentality 3 of any suitable or usual construction and having a cradle 5, the latter sliding in guides 7 carried by the feed cylinder 9. Carried by the feed cylinder I provide a support 11 for connection to a tripod or mine column.

In the feed cylinder I mount the piston 13 having packing rings 15 for causing the piston to fit the interior walls of the cylinder in a fluid tight manner. Extending rearwardly through the rear cylinder head 17 of the cylinder I provide the section 19 of the piston rod, which section is in the form of a tube attached to the piston or may be formed integrally therewith. Carried by the rearward end of the piston rod section 19 is the tubular piston rod section 21 having a portion 23 forming a return bend and serving as a handle for moving the drill bit actuator manually. The end of the portion 23 is connected to an end of the tubular piston rod section 25 and the opposite end of the latter is connected to a member 27 having the screw threaded end 29 which is coupled to the drill bit actuator by means of the union nut 31.

For connecting the machine to a source of motive fluid, I provide a hose connection 33 carried by the actuator, the connection being permanently or otherwise in communication with the rearward end of the conduit 35 of the member 27.

The feed piston 13 is provided with the internal rearwardly tapered socket 38 in which is rotatably mounted the inner piston member 37 which fits the socket in a fluid tight manner and serves as a valve. Integrally formed with or connected to the member 37 is the stem 39 which extends rearwardly through the piston rod and terminates exteriorly of the piston rod section 21. On the end of the stem I secure an operating handle 41 and interiorly of the stem I form a conduit 43 extending from the extreme rearward end of the stem to adjacent the forward face of the member 37. The piston rod section 21 I form with an internal boss 45 perforated to receive the stem and carrying the packing 47 for preventing egress of motive fluid around the stem. Exteriorly of the member 21 I provide an annular flange 49 forming a socket and surrounding the stem. Interiorly of the socket I place a compression spring 51 which abuts at one end thereof the bottom of the socket and at its other end the operating handle so as to place the stem under tension to insure that the valve at all times will be securely held to its seat. The wall of the flange 49 is provided with a bore carrying the spring-pressed pin 53 adapted to engage recesses 55 formed in the forward face of the operating handle, the pin and recesses constituting a non-positive lock for holding the valve in its adjusted positions.

In the body portion of the piston 13 I form a plurality of bores 57 closed at the rearward ends by plugs 59 and having ports 61 placing the bores in communication with the forward face of the piston. For controlling the passage of motive fluid into the bores 57 I provide each with a ball check valve 63 normally held to its seat by a compression spring 65. Placing each bore 57 in communication with the tapered socket of the piston is a communicating radial passage 67, while in the same plane as the passages 67 I provide the valve with a radial passage 69 placing the exterior surface of the valve in communication with the conduit 43 of the stem 39. In the lower portion of the piston 13 I provide a passage 71 placing the rearward face of the piston in communication with the tapered socket of the piston and in the same plane with the point of communication of the passage 71 with the socket I provide the valve with an exterior arcual groove 73, the groove being placed in permanent communication with the interior of the piston rod section 19 by means of the intersecting passage 75 as is clearly illustrated by Figs. 3 and 4. The forward end of the passage 75 is in communication with the radial port 77 placing the passage 75 in communication with the exterior surface of the valve while in communication with the forward face of the piston I provide a passage 79 opening into the tapered socket in the plane of the port 77. In the same plane as the point of communication of passage 69 with the exterior of the valve I provide the piston with a radial passage 80 opening into the socket and communicating with the passage 81 opening through the rearward face of the piston.

The member 27 I may provide with a three-way throttle valve 83 of any suitable construction adapted to place the interior of the piston rod in communication with either the motive fluid supply or the vent 85 leading to the atmosphere and to throttle the supply to the piston rod.

With the parts in the position illustrated by Fig. 3, assuming motive fluid is supplied to the interior of the piston rod, said motive fluid will pass through the passages 75, 77 and 79 into the forward end of the feed cylinder and as at this time the rearward end of the feed cylinder is placed in communication with the atmosphere by way of the passages 81, 80, 69 and 43, the piston will be forced rearwardly to retract the drill bit from the rock. When it is desired to advance the drill bit towards the rock, the valve is turned in the direction of the arrows in Figs. 4, 5 and 6 to bring it into the position illustrated by Fig. 2 in which position the passage 69 is placed in communication with one of the ports 67 and the annular groove 73 in communication with the passage 71. This places the rearward end of the cylinder in communication with the source of motive fluid and places the forward end of the feed cylinder in communication with the atmosphere by way of one of the check valves 63 and its communicating passages and the piston moves forwardly.

It will be noted that the degree of back pressure in the forward end of the feed cylinder depends upon the tension of the spring 65 holding the check valve 63 to its seat. Preferably, I make the springs 65 for the check valves of different strengths in order that the back pressure may be varied by moving the valve to cause the passage 69 thereof to select different ports 67 and it will be observed in this manner that the degree of feeding force may be varied.

Although I have described for purposes of illustration of my invention embodied in a specific form of rock drill, it will be understood that I am not limited to the mechanical details of this embodiment but that my invention is applicable to other machines and that wide deviations from the embodiment shown may be made without departing from the spirit of my invention.

Claims:

1. In a power cylinder of the character described, a cylinder, a piston, admission means for admitting motive fluid to one end of said cylinder for urging said piston to move, and means independent of the motive fluid supply for controlling the rate of movement of said piston comprising an exhaust valve opening movement of which is caused by the pressure of the fluid in the opposite end of said cylinder opposing movement of said piston, said valve being weighted against opening movement, whereby fluid is trapped in said opposite end of said cylinder until a predetermined pressure is reached, and means including said valve for connecting said opposite end of said cylinder to the atmosphere.

2. In a power cylinder of the character described, a cylinder, a piston, admission means for one end of said cylinder, exhaust means for the other end of said cylinder, a plurality of differently weighted exhaust valves, and means for selectively causing said valves to control said exhaust means.

3. In a power cylinder of the character described, a cylinder, a piston, admission and exhaust means for opposite ends of said cylinder, said admission means for one end of said cylinder admitting motive fluid to said end for urging movement of said piston, and means for controlling the rate of movement of said piston comprising an exhaust valve opening movement of which is caused by the pressure of the fluid in the opposite end of said cylinder opposing movement of said piston, said valve being weighted against opening movement, whereby fluid is trapped in said opposite end of said cylinder until a predetermined pressure is reached, and means including said valve for connecting said opposite end of said cylinder to the atmosphere.

4. In a power cylinder of the character described, a cylinder, a piston, means for admitting fluid to one end of said cylinder, for urging said piston to move, means for controlling the rate of movement of said piston comprising a weighted exhaust valve opening movement of which is caused by the pressure of the fluid in the opposite end of said cylinder opposing movement of the piston, said means causing and maintaining a predetermined back pressure in said opposite end of said cylinder, and means for controlling said weighted exhaust valve means for varying the degree of said back pressure.

5. A rock drill having in combination a drilling tool, a drilling tool actuator, a feed cylinder and feed piston, means for admitting pressure fluid to said feed cylinder at one side of said feed piston for urging relative movement between said feed cylinder and feed piston in the direction of feed for said drilling tool, means independent of the pressure fluid supply for controlling the rate of the feeding comprising conduit means connecting said cylinder at the opposite side of said piston to the atmosphere, means associated with said conduit means for automatically regulating the escape of air through said conduit means, and manually operated means for varying the rate of escape of said air.

6. A rock drill having in combination a drilling tool, a drilling tool actuator, a feed cylinder and feed piston, means for admitting pressure fluid to said feed cylinder at one side of said feed piston for urging relative movement between said feed cylinder and feed piston in the direction of feed for said drilling tool, means independent of the pressure fluid supply for controlling the rate of the feeding comprising a conduit connecting said cylinder at the opposite side of said piston to the atmosphere, and a weighted exhaust valve opening movement of which is caused by the pressure of the fluid at said opposite side of the piston controlling the escape of air through said conduit.

7. A rock drill having in combination a drilling tool, a drilling tool actuator, a feed cylinder and feed piston, means for admitting pressure fluid to said feed cylinder at one side of said feed piston for causing relative movement between said feed cylinder and feed piston, a plurality of differently weighted exhaust valves for permitting exhaust from said feed cylinder at the opposite side of said piston, and means for selectively causing said valves to operate.

8. A rock drill having, in combination, a drilling tool, a drilling tool actuator, a feed cylinder and feed piston, a conduit means for connecting an end of said feed cylinder to the atmosphere, a weighted exhaust valve for said conduit means opening movement of which is actuated by the pressure of the fluid in said end of said cylinder, and controlling means for admitting pressure fluid to said end of said cylinder and simultaneously rendering said exhaust valve inoperative, and for admitting pressure fluid to the opposite end of said cylinder and simultaneously rendering said exhaust valve operative.

9. A rock drill having, in combination, a drilling tool, a drilling tool actuator, a feed cylinder and feed piston, a conduit means for connecting an end of said cylinder to the atmosphere, a weighted exhaust valve for said conduit means opening movement of which is caused by the pressure of the fluid in said end of said cylinder, and controlling means for admitting pressure fluid to said end of said cylinder and simultaneously blanking said conduit means, and for admitting pressure fluid to the opposite end of said cylinder and simultaneously opening said conduit means and causing cessation of the admission to the first mentioned end of said cylinder.

10. A rock drill having in combination a drilling tool, a drilling tool actuator, a feed cylinder and feed piston, means for admitting motive fluid to said feed cylinder at opposite sides of said feed piston for feeding or retracting said tool, a plurality of differently weighted exhaust valves for one end of said feed cylinder, and a single valve for controlling the admission and exhaust for said feed cylinder and for selectively causing different weighted exhaust valves to operate.

11. A rock drill having in combination a drilling tool, a drilling tool actuator, a feed cylinder and feed piston, means for selectively causing a predetermined back pressure at one side of said feed piston, means for admitting pressure fluid to said feed cylinder at the opposite side of said feed piston, and a single controlling means for operating both said means for selectively causing the back pressure and said means for admitting the pressure fluid.

12. A rock drill having in combination a drilling tool, a drilling tool actuator, a feed cylinder and feed piston, means for admitting pressure fluid to said feed cylinder at one side of said feed piston for causing relative movement between said feed cylinder and feed piston, a weighted exhaust valve, means for admitting pressure fluid to said feed cylinder at one side of said feed piston for retracting the drilling tool, means for admitting pressure fluid to said feed cylinder at the opposite side of said feed piston for feeding the drilling tool and for simultaneously connecting said feed cylinder at the opposite side of said feed piston to the atmosphere by way of said weighted exhaust valve.

13. A rock drill having in combination a drilling tool, a drilling tool actuator, a feed cylinder and feed piston, means for admitting pressure fluid to said feed cylinder at one side of said feed piston for causing relative movement between said feed cylinder and feed piston, a plurality of differently weighted exhaust valves, means for admitting pressure fluid to said feed cylinder at one side of said feed piston for retracting the drilling tool, means for admitting pressure fluid to said feed cylinder at the opposite side of said feed piston for feeding the drilling tool and for simultaneously connecting said feed cylinder at the opposite side of said feed piston to the atmosphere by way of one or another of said weighted exhaust valves.

14. In a drilling machine, a drill bit, a feeding device comprising a stationary cylinder and its piston, said cylinder constituting the direct supporting member for the machine, an actuating device for said drill bit slidably carried by said cylinder, connecting means comprising a substantially U-shaped piston rod projecting from the rear of said cylinder for causing said piston to move said actuator relatively to said cylinder, and manually operated pressure fluid control means for one of said devices carried by said U-shaped connecting means.

15. In a drilling machine, a stationary feed cylinder, a drill bit actuator slidably carried thereby in non-rotative relation, a piston in said cylinder, a substantially U-shaped piston rod connected at opposite ends to said piston and actuator, a valve for controlling the actuating fluid admitted to said cylinder, said valve carried by said piston interiorly of said cylinder, and means carried by said rod adjacent the bend of said U for actuating said valve.

16. In a drilling machine, a stationary feed cylinder, a drill bit actuator slidably carried thereby, a controlling valve in said piston interiorly of said cylinder, a hollow sectional substantially U-shaped piston rod projecting from the rear of said cylinder and attached to said actuator for connecting said piston and actuator, a handle for said controlling valve carried by one of said sections of said piston rod, and a stem for said valve extending through said rod and connecting said valve and handle.

17. In a drilling machine, a feed cylinder, a drill bit actuator slidably carried by said feed cylinder in side by side relation thereto, a feed piston in said feed cylinder, a feed piston rod having a straight portion extending through the rearward end of said feed cylinder, said rod having a forwardly directed portion connecting the rearward end of said straight portion to said actuator, a controlling valve for said feed cylinder, and an operating handle for said valve situated exteriorly of said feed piston rod adjacent the juncture of said straight portion and said forwardly directed portion.

18. In a drilling machine, a feed cylinder, a drill bit actuator slidably carried by said feed cylinder in side by side relation thereto, a feed piston in said feed cylinder, a feed piston rod having a straight portion extending through the rearward end of said feed cylinder, said rod having a forwardly directed portion connecting the rearward end of said straight portion to said actuator, a controlling valve for said feed cylinder and carried by said feed piston, and an operating handle for said valve situated exteriorly of said feed piston rod adjacent the juncture of said straight portion and said forwardly directed portion.

19. In a drilling machine, a drill bit, a feeding device comprising a cylinder and its piston, an actuating device for said drill bit slidably carried by said cylinder in side by side relation thereto, connecting means comprising a substantially U-shaped hollow fluid conducting member in fluid communication with said cylinder and attached at one end portion to said piston and at its opposite end portion to said actuator, and pressure fluid control means for said feed piston carried by said connecting means comprising a valve for selectively connecting said hollow member to the atmosphere or to a source of motive fluid supply.

20. In a drilling machine, a drill bit, a feeding device comprising a cylinder and its piston, an actuating device for said drill bit and carried by said cylinder in side by side relation thereto, a substantially U-shaped hollow fluid conducting piston rod extending through the rear end of said cylinder and attached at one end to said piston, a valve casing connecting the other end of said rod to said actuator, and a valve in said valve casing for controlling said feed piston.

21. In a drilling machine, a stationary feed cylinder constituting a direct support for said machine, a drill bit actuator slidably carried by said cylinder in side by side relation thereto, a piston in said cylinder, a substantially U-shaped piston rod one leg of which is attached to said piston and extends through the rearward end of said cylinder and the other leg of which is attached to said actuator, means for controlling the movement of said piston, said means having a controlling member located adjacent the bend of said rod.

22. In a drilling machine, a feed cylinder, a drill bit actuator slidably carried by said feed cylinder in side by side relation thereto, a feed piston in said feed cylinder, a hollow sectional substantially U-shaped feed piston rod extending through the rearward end of said feed cylinder and connected to said actuator, the section at the bend of said U-shaped rod being formed to provide a handle for manually feeding said drill bit actuator, and a controlling valve for the motive fluid admitted to said feed cylinder having a valve operating handle carried by said last named section.

23. In a drilling machine, a feed cylinder, a drill bit actuator slidably carried by said feed cylinder in side by side relation thereto, a feed piston in said feed cylinder, a sectional hollow substantially U-shaped fluid conducting feed piston rod extending through the rearward end of said feed cylinder and connected to said actuator, the section at the end of said U-shaped rod being formed to provide a handle for manually feeding said drill bit actuator, and a controlling valve for the motive fluid admitted to said feed cylinder having a valve operating handle carried by said last named section.

In testimony whereof, I have signed my name to this specification.

JOHN ALBERT PIERSON.

CERTIFICATE OF CORRECTION.

Patent No. 1,738,151.   Granted December 3, 1929, to

JOHN ALBERT PIERSON.

It is hereby certified that error appears in the printed specification of the above numbered patent requiring correction as follows: Page 4, line 33, claim 16, before the words "a controlling" insert "a piston in said cylinder,"; and that the said Letters Patent should be read with this correction therein that the same may conform to the record of the case in the Patent Office.

Signed and sealed this 31st day of December, A. D. 1929.

(Seal)

M. J. Moore,
Acting Commissioner of Patents.

nected to said actuator, the section at the end of said U-shaped rod being formed to provide a handle for manually feeding said drill bit actuator, and a controlling valve for the motive fluid admitted to said feed cylinder having a valve operating handle carried by said last named section.

In testimony whereof, I have signed my name to this specification.

JOHN ALBERT PIERSON.

CERTIFICATE OF CORRECTION.

Patent No. 1,738,151.  Granted December 3, 1929, to

JOHN ALBERT PIERSON.

It is hereby certified that error appears in the printed specification of the above numbered patent requiring correction as follows: Page 4, line 33, claim 16, before the words "a controlling" insert "a piston in said cylinder,"; and that the said Letters Patent should be read with this correction therein that the same may conform to the record of the case in the Patent Office.

Signed and sealed this 31st day of December, A. D. 1929.

M. J. Moore,
Acting Commissioner of Patents.

(Seal)